(12) United States Patent
Chandrasekaran et al.

(10) Patent No.: US 10,027,634 B2
(45) Date of Patent: *Jul. 17, 2018

(54) MOBILE DEVICE SECURITY

(71) Applicant: Scentrics Information Security Technologies Ltd, Limpsfield, Surrey (GB)

(72) Inventors: Guru Paran Chandrasekaran, London (GB); Andrea Bittau, London (GB)

(73) Assignee: Scentrics Information Security Technologies Ltd., Limpsfield, Surrey (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/467,261

(22) Filed: Mar. 23, 2017

(65) Prior Publication Data

US 2017/0201501 A1     Jul. 13, 2017

Related U.S. Application Data

(63) Continuation of application No. 13/982,188, filed as application No. PCT/GB2012/050192 on Jan. 30, 2012, now Pat. No. 9,628,452.

(30) Foreign Application Priority Data

Jan. 28, 2011 (GB) .................................. 1101507.0

(51) Int. Cl.
*G06F 9/00* (2006.01)
*H04L 29/06* (2006.01)
*H04W 12/02* (2009.01)

(52) U.S. Cl.
CPC .......... *H04L 63/0428* (2013.01); *H04L 63/06* (2013.01); *H04L 63/0876* (2013.01);
(Continued)

(58) Field of Classification Search
CPC ............. H04L 63/0464; H04L 63/0254; H04L 63/0428
(Continued)

(56) References Cited

U.S. PATENT DOCUMENTS

| 6,721,424 B1 | 4/2004 | Radatti |
| 2006/0206941 A1 | 9/2006 | Collins |

(Continued)

FOREIGN PATENT DOCUMENTS

| JP | 2005268873 A | 9/2005 |
| KR | 1020080052859 | 6/2008 |
| WO | WO03032571 A1 | 4/2003 |

OTHER PUBLICATIONS

Rekhis et al., "A Formal Rule-Based Scheme for Digital Investigation in Wireless Ad-hoc Networks," 2009 Fourth International IEEE Workshop on Systematic Approaches to Digital Forensic Engineering Year: 2009 pp. 62-72.*

(Continued)

*Primary Examiner* — Roderick Tolentino
(74) *Attorney, Agent, or Firm* — O'Shea Getz P.C.

(57) ABSTRACT

A system is described for communicating with a mobile device. The mobile device exchanges an electronic message with a messaging server, where the message is encrypted with a messaging key. The mobile device encrypts a copy of the message with a monitoring key different from the messaging key, and sends the encrypted copy to a monitoring server remote from the messaging server. The mobile device communicates with the messaging server via a network router. The network router is configured to block transmission of an encrypted electronic message between the mobile device and the messaging server when an access condition is not met.

21 Claims, 1 Drawing Sheet

(52) U.S. Cl.
CPC ............. *H04L 63/30* (2013.01); *H04W 12/02* (2013.01); *G06F 2221/2111* (2013.01)

(58) Field of Classification Search
USPC ...................................................... 726/11–15
See application file for complete search history.

(56) References Cited

U.S. PATENT DOCUMENTS

| | | | |
|---|---|---|---|
| 2007/0016663 A1* | 1/2007 | Weis .................... | G06F 11/2028 709/223 |
| 2007/0038387 A1 | 2/2007 | Chen et al. | |
| 2007/0038687 A1* | 2/2007 | Carroll ............. | G06F 17/30073 |
| 2007/0129083 A1* | 6/2007 | Creamer ................. | H04W 4/02 455/456.1 |
| 2009/0016538 A1* | 1/2009 | Drudis ................. | H04M 15/00 380/279 |
| 2009/0204817 A1* | 8/2009 | Deana-Roga ....... | H04L 63/0464 713/171 |
| 2010/0138910 A1 | 6/2010 | Aldor et al. | |
| 2010/0146260 A1* | 6/2010 | Levow ................ | H04L 63/0245 713/154 |
| 2010/0325734 A1* | 12/2010 | Etchegoyen .......... | G06F 21/121 726/26 |
| 2011/0154041 A1* | 6/2011 | Godfrey ................ | H04W 12/04 713/171 |
| 2013/0159704 A1 | 6/2013 | Chandrasekaran | |

OTHER PUBLICATIONS

Li et al., "Study of Network Monitoring Theory in Switched Ethernet and its Countermeasures," 2011 International Conference on Internet Computing and Information Services Year: 2011 pp. 585-588.*

Li et al. "Study of Network Monitoring Theory in Switched Ethernet and its Countermeasures", 2011 International conference on Internet Computing and Information Services, pp. 585-588.

Rekhis et al. "A Formal Rule-Based Scheme for Digital Investigation in Wireless Ad-Hoc Networks", 2009 Fourth International IEEE Workshop on Systematic Approaches in Digital Forensic Engineering, pp. 62-72.

Sumiya "Excellent! Amazing Tool Combination", Net Runner, SOFTBANK Publishing, Japan, Aug. 1, 2004, vol. 6, No. 8, pp. 24-27.

Okamot, "Encryption Technology for Realization of Bright Information Society 5: Encryption Key Distribution Management", Bit, Kyoritsu Publishing, Japan, Nov. 1, 1991, vol. 23, No. 12, pp. 51-59.

* cited by examiner

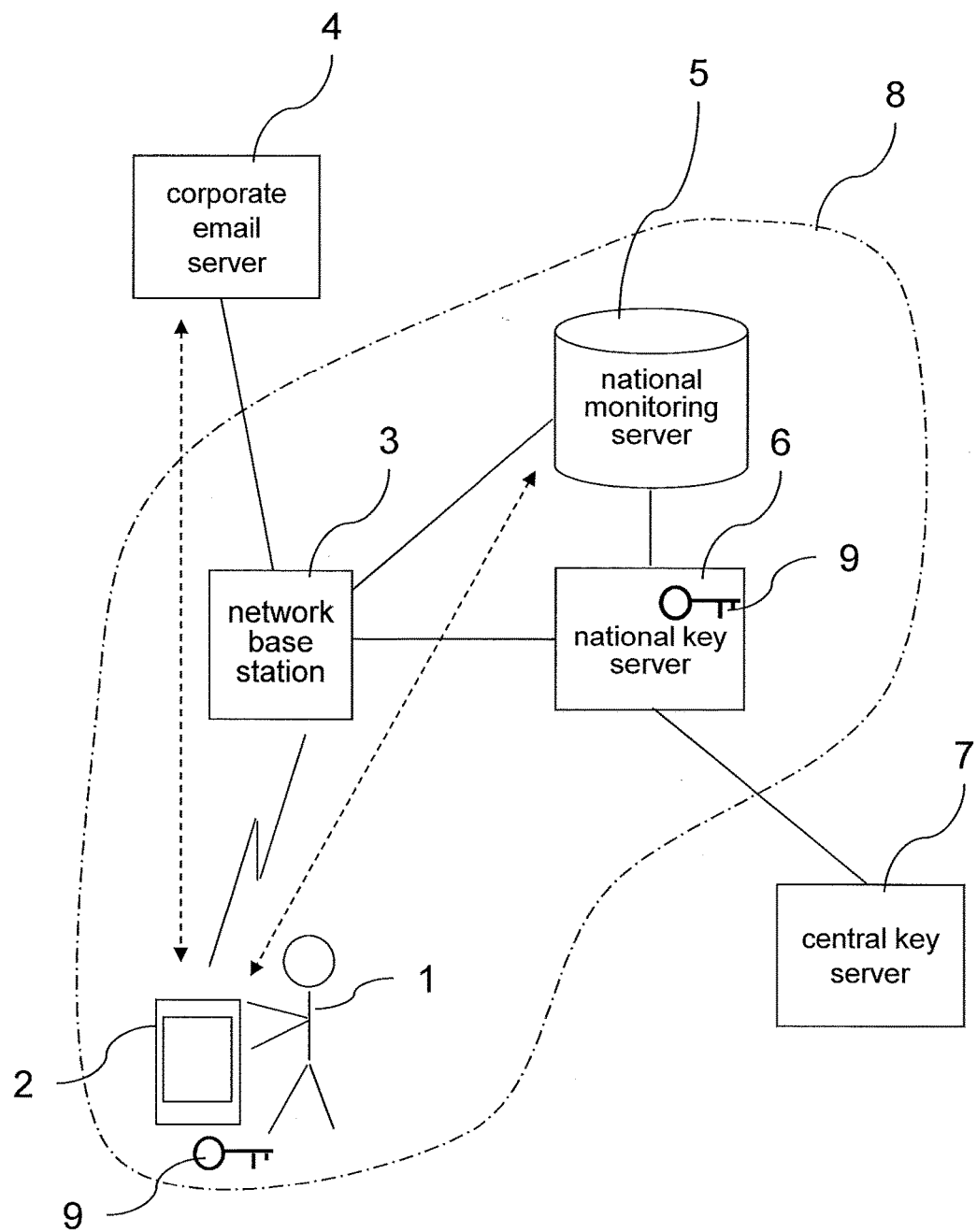

MOBILE DEVICE SECURITY

This application is a continuation of U.S. patent application Ser. No. 13/982,188 filed Dec. 2, 2013, which claims priority to PCT Application No. PCT/GB2012/050192 filed on Jan. 30, 2012, which claims priority to Great Britain Application No. 1101507.0 filed Jan. 28, 2011, all of which are herein incorporated by reference.

BACKGROUND OF THE INVENTION

1. Technical Field

This invention relates to a system and method for allowing an authorized third party to access encrypted electronic messages sent to or from a mobile device.

2. Background Information

Portable devices for sending and receiving messages, e.g. by email, are very popular. The Blackberry (®) range of devices, produced by the company Research In Motion, is one example.

Typically, when an email addressed to the user of such a portable device is received at a suitably-configured mail server, such as a mail server inside a corporate firewall at the user's place of employment, the email is encrypted and then forwarded over the wired Internet to a network operation center (NOC) operated by the email service provider. The NOC is in contact with the user's mobile device, and pushes the email to the device via a wireless telecoms network local to the user. The message is decrypted at the mobile device and displayed to the user.

When the user sends an email from the mobile device, it travels to the NOC and then on to the relevant mail server, which delivers it to the intended recipient.

Usually the messages are cryptographically encrypted at least while in transit between the NOC and the mobile device, thereby preventing any third party from being able to access the message content by intercepting or eavesdropping on the communication. In this way the privacy of the sender and recipient of the message can be protected. In a corporate setting, encryption is usually established between the corporate mail server and the mobile device.

However, there are circumstances in which it is desirable for an authorized third party, other than the sender, the recipient or the messaging service provider, to be able to decrypt the message. For example, a national law-enforcement or security body may, on occasion, wish to access messages in order to carry out its duties effectively; e.g. to intercept messages being sent or received by a known or suspected criminal in the country.

Such interception is not possible when the messages are sent or received strongly encrypted between a portable device, and an NOC or mail server which is located outside the jurisdiction of the relevant authority.

Although governments may request messaging service providers to provide access to encryption keys or decrypted messages, the service providers are typically either reluctant or unable to do so. For example, where end-to-end encryption is used between a corporate mail server and a portable device, a messaging service provider may not itself have access to the necessary decryption keys for accessing a decrypted message.

The present invention seeks to provide a mechanism that addresses these difficulties.

SUMMARY OF THE DISCLOSURE

From one aspect, the invention provides a method of communicating using a mobile device, comprising the mobile device: sending to a messaging server, or receiving from a messaging server, an electronic message which is encrypted with a messaging key; encrypting a copy of the message with a monitoring key different from the messaging key; and sending the encrypted copy to a monitoring server remote from the messaging server.

The invention extends to a mobile device configured to: send to a messaging server, or receive from a messaging server, an electronic message which is encrypted with a messaging key; encrypt a copy of the message with a monitoring key different from the messaging key; and send the encrypted copy to a monitoring server remote from the messaging server.

The invention further extends to a system for communicating using a mobile device, comprising: a mobile device configured as above; a messaging server configured for transmission, between the messaging server and the mobile device, of an electronic message which is encrypted with a messaging key; and a monitoring server remote from the messaging server, configured to receive an encrypted copy of the message.

The system may additionally comprise monitoring means configured to decrypt an encrypted copy of a message received by the monitoring server, and to display at least part of the decrypted message. The monitoring means may be a computing device comprising a display, such as a personal computer (PC), for example. The monitoring server preferably comprises storage means, such as optical, magnetic or silicon memory, arranged to store encrypted copies of messages.

Thus it will be seen by those skilled in the art that, in accordance with the invention, an encrypted copy of a message sent securely from the mobile device, or received securely by it, is generated by the device itself, and is sent to a monitoring server, where it can be decrypted by an authorized third party who has access to a decryption key associated with the monitoring key. In this way, an authorized third party can, when needed, monitor a message without the operator of the messaging server being required to participate in the monitoring process.

Because both the message and its copy are encrypted when in transit to or from the mobile device, unauthorized eavesdropping by malicious parties is still prevented.

The messaging server may be a network operation center (NOC), operated by a messaging service provider such as Research In Motion (®); or it may be a component of a corporate email system, such as a Blackberry Enterprise Server (®) or Microsoft Exchange ActiveSync (®), or of a public email service such as Microsoft's Hotmail (®) or Google's Gmail (®).

The monitoring server would typically be managed by, or be accessible to, a government agency, such as a national security department or law-enforcement body, although this is not essential.

Embodiments of the invention are not limited to any particular separation between the messaging server and the remote monitoring server. The servers may typically be on different physical sites from one another; they may be separated by at least 10 km, 100 km, 1,000 km or more. However, this is not essential; they may, for example, be situated in different buildings on the same site, or in different racks within a single building.

The necessary keys for decrypting messages at the monitoring server may be stored on, or be accessible to, the monitoring server, but it is preferred that they are held elsewhere, potentially by a body independent from a national government, who can be trusted to provide or use the key for decrypting one or more stored messages only when certain conditions are met; e.g. when a government agency has been given a court order authorizing the reading of one or more intercepted messages.

A key server may release a decryption key when an authorization condition has been met. Alternatively or additionally the key server may perform a decryption operation using the decryption key when an authorization condition has been met.

The mobile device may send copies to the monitoring server of received encrypted messages only, or of sent encrypted messages only, but preferably sends copies for both received and sent encrypted messages. The encrypted copies may be sent by any suitable means, such as Simple Mail Transfer Protocol (SMTP), Hypertext Transfer Protocol (HTTP), File Transfer Protocol (FTP), or a proprietary protocol. They may be sent substantially at the same time as transmission of the message between the messaging server and the mobile device (e.g. within 1, 10 or 60 seconds thereof), or may be sent later, for example, in a batch of several copied messages at once.

The sending of the message copy is preferably invisible to the device user; e.g. happening in the background while the user interacts with an email client as normal. The user is therefore not inconvenienced by the copy transmission.

The copy of the message sent to the monitoring server may be compressed, either before or after encryption. This can reduce network traffic.

The messaging server, monitoring server and any key server may be located in different buildings from each other, while still being in the same country, or two or more of them may be in different countries from each other.

The invention may be particularly useful when the messaging server is located outside a jurisdiction in which the portable device is being used, or outside the jurisdiction of a body managing the monitoring server, since without the invention there would not necessarily be any legal or physical mechanism by which a jurisdictional body, such as a national intelligence agency, could access unencrypted messages from the messaging server.

The mobile device may be a smartphone or a text messaging device, such as a Blackberry (®), and is preferably configured to display at least part of the message, e.g. on a display screen.

The message may comprise or be an email (e.g. as defined in the Internet Engineering Task Force's RFC 5322), or a part of an email, such as some or all of its body or headers, or any other text or multimedia content. For example, the message may comprise or consist of all or part of a Short Message Service (SMS) message or a BlackBerry (®) PIN message or a BlackBerry (®) Messenger (BBM) message. Although the invention is currently envisaged as being most useful with a discrete message, such as an email or a multimedia packet, a message could instead be a data stream, such as one side of a telephone call or videoconference call.

The message is preferably sent or received wirelessly by the device, e.g. over a mobile telecoms network or an IEEE 802.11 network. The message will, however, typically also travel over a wired network such as the Internet for at least part of its journey to the messaging server or monitoring server.

When the message is sent by the device, the copy of the message may be sent before, or after, or at the same time as the message itself is sent.

The messaging key, or a corresponding decryption key, is preferably known only to one or both of the messaging server and the mobile device. The key may be used with a symmetric encryption algorithm such as Advanced Encryption Standard (AES), or with an asymmetric algorithm such as RSA (Rivest, Shamir, Aldeman).

The monitoring key may be suitable for use with the same encryption algorithm as the messaging key, or for a different algorithm.

The system preferably comprises one or more key servers, which may be the same or different from a monitoring server. A key server may be bound to a geographic or jurisdictional region.

The key server may store or have access to information relating to a set of mobile devices implementing the invention. In particular, the key server may have access to a cryptographic monitoring key that is specific to a particular mobile device. It may be able to generate such keys. A monitoring key may additionally or alternatively be specific to the particular key server or monitoring server, or to a set of key or monitoring servers within a geographic or jurisdictional region.

The information relating to a specific mobile device may be prevented from leaving the key server unless an access condition is met, such as a valid password being received by the key server. This access condition may be established between the mobile device or the device user and the key server during a registration process.

The mobile device may cache the monitoring key for reuse, optionally with a finite lifetime set for the key. By caching the key in the mobile device, network traffic can be reduced. A monitoring key may expire after use with a single message (in which case caching the key for subsequent reuse would typically be inappropriate), or it might be usable indefinitely. Alternatively, between these extremes, a monitoring key might have a lifetime of, say, a week, after which time the mobile device will need to request a new key.

If the mobile device does not have access to an in-date monitoring key, it may access a key server, in order to obtain a new monitoring key. The key may be associated with a key identifier which may also be provided to the mobile device, or directly to the monitoring server. A user of the mobile device may have to satisfy an access condition, such as entering a valid password or biometric data, before the monitoring key becomes accessible to the device. Data relating to the access condition, such as a password, may be transmitted to the key server for verification, preferably over a secure connection such as one using Transport Layer Security (TLS) or Secure Sockets Layer (SSL).

The monitoring key, and optionally other policy or profile information, may be obtained by the mobile device from a key server in accordance with any of the methods described in WO 2011/083343, which is hereby incorporated by reference in its entirety.

The mobile device may advantageously contain a hardware cryptography engine or module, such as a Trusted Platform Module conforming to specifications from the Trusted Computing Group. This can allow the mobile device to be authenticated by the key server with a high degree of confidence. It can also allow the mobile device to authenticate the key server with confidence. It can also protect cryptographic keys stored on the device, such as the monitoring key, from being read by a user of the device or by an attacked. It may also be used to enforce policies on the mobile device. Such a hardware module is not essential, however, and appropriate cryptographic functions may instead be performed by software running on the device.

In addition to sending an encrypted message copy to the monitoring server, the mobile device may identify to the monitoring server the monitoring key which was used to encrypt the message. It may do this by sending a key identifier in addition to the message. For example, a unique key identifier might be included in a data transmission with the encrypted message.

The monitoring server may store the encrypted copy of the message along with an identifier indicating a key for decrypting the message.

This identifier may be used to obtain the appropriate key from the key server, should a message need to be decrypted. Technical or procedural mechanisms may be in place to ensure that only authorized access to the decryption key is permitted. A decryption key may only allow the decryption of a single message, or may enable decryption of some or all messages sent or received by a mobile device, depending on what policy has been used regarding key lifetimes.

The key server may be configured to receive an encrypted message and decrypt it using a decryption key associated with the monitoring key. Alternatively or additionally the monitoring server may be configured to receive a decryption key associated with the monitoring key and to decrypt an encrypted message. The decryption key may be the monitoring key (e.g. in a symmetric cipher) or it may be one of a pair of keys in an asymmetric cipher.

In a preferred set of embodiments, the system comprises a central key server and one or more regional key servers. The central key server may be configured to store or access information relating to a plurality of mobile devices, such as profile information or access condition information (e.g. passwords). Each regional key server is preferably configured for secure communication with the central key server.

Having a regional key server located in each jurisdiction implementing the invention, rather than merely having a central key server located in, say, the United States of America, may be desirable for legal or practical reasons. In particular, national authorities may wish the decryption keys to be located within their jurisdictional boundary. Preferably a regional key server does not share monitoring keys or associated decryption keys with the central server.

A central server can nonetheless be desirable for coordinating the provision of monitoring keys across multiple regions, e.g. to prevent a mobile device user having to re-register security information with the system, or to re-install software, when travelling between countries.

A regional key server may be configured to retrieve information specific to a mobile device from the central key server. This may include information relating to access conditions (such as a password), or user preferences or policy requirements.

A key server, such as a regional key server, may be configured to store monitoring keys, or associated decryption keys. These may be stored indefinitely, or for a predetermined duration.

This may impose significant storage requirements, especially if each monitoring key only has a relatively short lifetime. Alternatively therefore, in some embodiments, a key server is configured to generate a decryption key associated with a monitoring key, which need only be done as required. This can be accomplished by the key server having access to a master key, and using the result of encrypting a monitoring key (or associated decryption key) with the master key (using a suitable cipher) as a key identifier for that monitoring key; i.e. the resulting ciphertext is used as the key identifier.

When an authorized body wishes to decrypt an encrypted message, which is stored on the monitoring server along with the relevant key identifier, the key identifier can be sent to the key server (optionally along with the encrypted message), and the key server can determine the relevant decryption key by decrypting the key identifier. In this way, no requirement to store decryption keys is placed on the key server; it can instead recreate a decryption key as required.

For increased security, the master key may be changed at intervals; however storing a history of master key changes is much less burdensome than storing monitoring keys directly.

In a preferred set of embodiments, the mobile device is configured to communicate with the message server via a network router which is configured to block transmission of an encrypted message between the mobile device and the messaging server (in one or both directions) when an access condition is not met (or equivalently, when a blocking condition is met). Preferably the system is such that, when the network router is blocking transmission, the message cannot be sent between the mobile device and the messaging server, at least while the mobile device remains in a predetermined geographical region. I.e. there is preferably no other communication channel by which the message may successfully be transmitted.

The access condition is preferably such that it is satisfied only if a user of the device indicates his assent to the mobile device sending a copy of the message to the monitoring server. In such embodiments, the mobile device may be configured to receive a binary input from a user, representing agreement or refusal to a copy of some or all messages sent or received (or both) by the mobile device being sent to the monitoring server. The agreement may be geographically or temporally limited; e.g. it may last for as long as the mobile device remains in a particular country or jurisdiction. The mobile device may communicate the result of the binary input to a server, and the input may be used to determine whether the network router blocks or allows the transmission of relevant messages.

Alternatively or additionally the access condition may be such that it is satisfied only if the mobile device is configured to send copies of encrypted messages to the monitoring server. I.e. a mobile device that is not configured to send a copy of messages to or from the messaging server will be prevented from communicating messages with the messaging server.

The network router may form part of a national Internet firewall, or it may be part of a wireless network infrastructure. For example, it may be a component of a mobile telecommunication network with which the mobile device is registered; this could be the device's home network or a network accessed via an international roaming agreement.

Such a network router is inventive in its own right, and thus from another aspect the invention provides a network router which is configured to block transmission of encrypted messages between a mobile device and a messaging server when an access condition for the mobile device is not met. Preferably, the network router is configured to allow the transmission of unencrypted messages between the mobile device and the messaging server while it is blocking encrypted messages.

The ability to block communication between the mobile device and the messaging server can be especially beneficial, in that it provides a mechanism whereby a user of the mobile device can be blocked from sending or receiving any messages that are not accessible to the monitoring server (at least while the user remains within a predetermined geographical region). In this way, when a mobile-device user arrives in a country which desires to be able to monitor messaging traffic to and from some or all mobile devices within its borders, the user can be presented (e.g. via SMS message) with the option either of allowing the possibility of official monitoring, or of having the messaging capabilities of the device disabled for the duration of the user's stay in the country.

Where, for example, a national government requires all mobile network operators providing coverage within its national boundaries to support a blocking mechanism as described, the government can ensure that copies of all relevant messages are sent to the monitoring server.

Other traffic such as unencrypted messages or voice calls may be allowed to be sent and received from the mobile device as normal, even while some or all encrypted messages are blocked. This can minimize inconvenience for a user who does not consent to the monitoring.

The device may be configured to carry out the steps of encrypting a copy of a message with a monitoring key and sending the encrypted copy to a monitoring server, by a software application running on the device. This software application may be transmitted to the mobile device, e.g. wirelessly, when the device first attempts to register with a suitable network, or at any other appropriate time. Many mobile devices have operating systems that allow the installation of software applications after shipment of the device, and mechanisms for delivering and installing such third-party software applications are well known.

The access condition may be such that it is satisfied only if the user installs, or allows the installation of, the software application.

The invention extends to a software application, to a carrier bearing the same, and to a signal encoding the same, comprising instructions which, when executed on a mobile device, cause the device to encrypt with a monitoring key a copy of a message received encrypted with a messaging key from a messaging server, or a copy of a message sent, or to be sent, encrypted with a messaging key to a messaging server; and to send the encrypted copy to a monitoring server remote from the messaging server, wherein the monitoring key is different from the messaging key.

By implementing steps of the present invention in a software application running on the mobile device, the device can be configured to support the invention without requiring the direct involvement of the device supplier (as might be the case if the functionality were provided in hardware or firmware), or of a messaging service provider (as might be the case if an attempt were made to monitor communications at the network level). This can be very advantageous given that such other parties may not be willing to cooperate for technical or commercial reasons.

The software application is preferably active whenever a relevant messaging application, such as an email client, is running on the mobile device.

The management of the transmission of messages between the mobile device and the messaging server may be implemented by the software application, or may be performed by a standard messaging function or application on the device. Similarly, the cryptographic operations on the original message may be provided by the software application or may be standard device functions.

The mobile device may be configured to determine a geographical, political or jurisdictional location in which it is situated. It may use this information to determine whether to send copies of encrypted messages to the monitoring server. It may access a list or database of locations or regions, stored on or off the device, in order to make this determination. For example, when the device registers with a mobile network, it may be informed that it is in country A. It can then query a database server to discover if country A requires encrypted messages to be sent to a monitoring server. The device may access a database to obtain a network address of a suitable monitoring server.

If a list of locations or regions is stored on the device, an update mechanism is preferably provided by which the list may be updated. The mobile device may obtain an update from a server, e.g. by receiving an SMS configuration message, or by accessing a central server. In some embodiments, the mobile device communicates with a predetermined DNS name or IP address, and a network component is configured so that the DNS name or IP address is routed to a server controlled by a geographic or jurisdictional authority. E.g. because each country controls its local network (mobile telecoms or Internet backbone), it can force DNS names to resolve to a particular address, or can route particular IP addresses to specific servers. In this way, the mobile device need only be configured with one address for use globally.

Although the invention has been described with reference to a single messaging server and a single monitoring server, it will be appreciated that the invention may be implemented using multiple messaging servers or multiple monitoring servers. Copies of messages may, for example, be sent to the nearest of several monitoring servers.

Blocking or monitoring of encrypted messages may be carried out for all messages sent or received by a mobile device, or only those sent or received to one or more specific messaging servers; e.g. only those situated outside the jurisdiction in which the mobile device is located (since, for example, a government may already be able to access copies of the messages sent through local Internet service providers).

A mobile device according to the invention may support a plurality of users or identities, e.g. different user log-ins or profiles for the or for one or more messaging servers. It will be appreciated that the sending of copies of messages to a monitoring server may be particular to a specific user or identity or email address. For example, a user who refuses to agree to monitoring may have her encrypted messages blocked, while another user (or the same user but acting under a different email address) may have agreed to the monitoring. References to the mobile device in the present specification should therefore be understood as potentially being limited to a particular combination of mobile device and user, user identity, or email address.

BRIEF DESCRIPTION OF THE DRAWINGS

Certain preferred embodiments of the invention will now be described, by way of example only, with reference to the accompanying drawings, in which FIG. 1 is a diagrammatic representation of a system embodying the invention.

DETAILED DESCRIPTION OF THE INVENTION

FIG. 1 shows a human user 1 of a mobile device, such as a Blackberry (®) smartphone 2. The smartphone 2 is in wireless communication with a mobile telephone network base station 3. The base station 3 is connected via the Internet to a corporate email server 4 running Blackberry Enterprise Server (®) software, with which the user has an email account.

Also connected to the base station 3 by the Internet are a national monitoring server 5 and a national key server 6. The national key server 6 is connected to a central key server 7.

The user 1, his smartphone 2, the network base station 3, the national monitoring server 5, and the national key server 6 are all located in the same country 8. The corporate email server 4 and the central key server 7 are, for this example, both situated outside the country 8 (although one or both of them could be inside it instead).

The user 1 may send and receive emails on the smartphone 2 via the corporate email server 4 using established techniques. Such emails are typically encrypted in transit between the smartphone 2 and the email server 4. If the national authorities of the country 8 in which the user is located wish to intercept an email, either to read it in real-time or to access it at a future time, they will be unable to access the unencrypted message, at least without requiring time-consuming efforts to crack the encryption.

Therefore, a monitoring software application is loaded on the user's smartphone 2, which uses a monitoring encryption key 9 to send a copy of any email sent or received by the smartphone 2 to the monitoring server 5, where it is stored (encrypted with the monitoring key 9). If an authorized national agency requires access to the contents of a stored email, it can use the monitoring key 9 stored in the national key server 6 to decrypt the email.

If the user 1 does not consent to installing or using the software monitoring application on his smartphone 2, the national authorities can instruct the mobile network base station 3 (or some other suitable router within the country 8) to block the passage of encrypted emails between the smartphone 2 and the corporate email server 4.

The operation of the system will now be described in more detail, first considering two different scenarios: (i) when the user asks the smartphone 2 to send an email; and (ii) at some point during the reception or opening of a received email by the smartphone 2.

(i) When the user 1 indicates to the smartphone's 2 email application that it should send an email, the following steps occur:

a software monitoring application on the smartphone 2 is activated and is given access to the email;

the monitoring application asks the smartphone 2 where it is currently located;

if the smartphone 2 is currently in a country where an encrypted email monitoring service is not required, then the application stops and passes control back to the smartphone's 2 email application; otherwise it continues, as below;

if the smartphone 2 does not have a recently-cached cryptographic monitoring key 9 for the country 8 in which is presently located, then the smartphone 2 contacts the national key server 6 to ask for such a key; a monitoring key 9 (such as an AES key), along with a unique key identifier, will then be transferred to the smartphone 2 by the national key server 6 using a secure download procedure, e.g. such as is described in WO 2011/083343;

a copy of the email to be sent is encrypted using the monitoring key 9, and the unique key identifier is integrated with the encrypted copy; and by suitable means, the monitoring application arranges for this encrypted copy to be transmitted to the national monitoring server 5, which is managed by appropriate interception authorities of the country 8.

This procedure will effectively double the data transmission cost for every transmitted email. However emails sent to the monitoring server 5 may be compressed to reduce network traffic.

Sending the copy email does not delay the user's experience of the smartphone 2 as it occurs as a background process, invisible to the user 1. The send (and receive) completes immediately just as when no monitoring is in place from the user interface and user's point of view.

(ii) When the smartphone's 2 email application receives a new email, the following steps occur:

the software monitoring application is activated and is given a handle to the received email;

the application asks the smartphone 2 where the smartphone is currently located;

if it is currently in a country where the monitoring service is not required, then the application stops and passes control back to the smartphone's 2 mail application; otherwise it continues as below;

if the smartphone 2 does not have a recently-cached cryptographic monitoring key 9 for the country 8 in which is presently located, then the smartphone 2 contacts the national key server 6 to ask for such a key; a monitoring key 9 (such as an AES key), along with a unique key identifier, will then be transferred to the smartphone 2 by the national key server 6 using a secure download procedure, e.g. such as is described in WO 2011/083343;

a copy of the received email is encrypted using the monitoring key 9, and the unique key identifier is integrated with the encrypted copy; and by suitable means, the monitoring application arranges for this encrypted copy to be transmitted to the national monitoring server 5, which is managed by appropriate interception authorities of the country 8.

There may be national key servers in several respective countries. Overall management of the various key servers can be coordinated by a central key server 7. This central key server 7 will maintain a profile and password for every smartphone 2 which has the monitoring software application installed. The central key server 7 will be updated every time the monitoring software application is installed on a smartphone 2. The central key server 7 has a means for secure communication with all the national key servers 6, e.g. in the form of shared cryptographic keys.

The national key server 6 keeps a set of user profiles and associated passwords, which can be managed as follows. When a smartphone 2 contacts national key server 6, the following steps can take place:

the national key server 6 checks whether or not it possesses a profile and password for this smartphone 2. If not, then the server 6 will contact the central key server 7 and request a copy of the appropriate password and profile information for this user (e.g. containing user preferences or policy requirements for this user). This information is sent to the requesting server 6 via a secure channel;

if no 'current' monitoring key 9 exists for this smartphone 2, then the national key server 6 generates a new such key, which can be stored in the locally-held user profile. This monitoring key 9 never need be passed back to the central key server 7;

the national key server 6 authenticates the smartphone 2 using the password (e.g. by requesting its transfer across an SSL-protected channel);

the national key server 6 then sends the monitoring key 9 (along with a unique identifier) to the smartphone 2; and the national key server keeps copies of all monitoring keys 9 (along with their unique identifiers) for a period of time determined by the interception authorities of the jurisdiction in which it is operated. Alternatively, instead of keeping copies of all monitoring keys 9, the national key server 6 might maintain a master key, and encrypt every monitoring key 9 under this master key, and send a smartphone 2 both plaintext and encrypted copies of the monitoring key 9. The encrypted copy will then serve as the unique identifier. Such a strategy can significantly reduce the storage and management requirements on the national key server 6. The master key could be changed regularly, e.g. on a daily or weekly basis.

A jurisdiction-specific monitoring key 9 could have a wide range of possible lifetimes. Its lifetime will have a significant effect on the granularity of the monitoring functionality. At one extreme a different key could be used for every message. That is, a new key would be generated every time the smartphone 2 requests one (in such a case, caching of monitoring keys at the smartphone 2 would not be possible). At the other extreme the jurisdiction-specific monitoring key for a particular smartphone 2 could be fixed. Key caching at the smartphone 2 could be used to reduce communication between the smartphone 2 and the national key server 6 to a single message on the first occasion that a smartphone 2 roams to a particular country. A middle approach involves a monitoring key having a fixed lifetime, e.g. a week, with key caching meaning that smartphone 2; thus key-server communications could be restricted to the occasional refreshing of the monitoring key.

There are two ways in which access to messages might be granted to appropriate bodies (in both cases assuming that the intercepting authority has copies of all the encrypted messages it wishes to have decrypted).

First, the intercepting authority might ask the national key server 6 to provide a monitoring key 9 or keys for a specific smartphone 2, using the unique identifiers sent in the encrypted messages. If the monitoring keys have a long lifetime, then this would mean that the intercepting authority might have the means to decrypt messages for a much longer period than its legal authority justifies. On the other hand, whilst frequent monitoring key changes would enable a much finer-grained level of monitoring, it would also potentially mean that larger volumes of keys would need to be provided to the authority.

Secondly, the intercepting authority could simply pass to the national key server 6 copies of all the message it wishes to have decrypted, and the server could then decrypt them and send them back. Whilst this would enable very fine-grained control over the monitoring capability, it would also means that potentially very large volumes of data would flow between the national key server 6 and the intercepting authority. Such an approach might also impose an unacceptable delay on licensed decryption, particularly for the case where monitoring access is required almost instantly for newly sent messages.

The precise choice of approach, and of monitoring granularity, will typically depend on the monitoring requirements of the jurisdiction involved and the degree of acceptability to the end user 1 of the associated smartphone-to-key-server communications overhead.

The system is able to inform the user 1 that monitoring may be occurring, and to give the user 1 the opportunity to accept the alternative, i.e. to have the smartphone 2 disabled.

The user 1 might be prompted for consent on every occasion where the smartphone 2 is about to contact the national key server 6, or on every occasion where the smartphone 2 is about to contact the monitoring server 5. Alternatively, user consent to such a process could be deemed valid for a specified period of time.

If the user denies monitoring access, the smartphone's 2 data capabilities will be barred. The local network operator will disallow all data traffic, or at least all encrypted emails, to and from the smartphone 2, until it receives a positive monitoring acknowledgement from the user 1.

Whilst specific embodiments of the invention are described herein, it will be appreciated that a wide range of modifications and alterations may be made to the arrangements described and illustrated without departing from the scope of the invention.

What is claimed is:

1. A system for communicating using mobile devices, comprising:
   a messaging server;
   a monitoring server;
   a network router; and
   a plurality of mobile devices,
   wherein each mobile device of a first set of one or more of the mobile devices is configured to (i) send to the messaging server, or receive from the messaging server, a respective electronic message, wherein the electronic message is sent encrypted with a respective messaging key; (ii) encrypt a copy of the electronic message with a respective monitoring key different from the messaging key; and (iii) send the encrypted copy to the monitoring server,
   wherein each mobile device of a second set of one or more of the mobile devices is configured to send to the messaging server, or receive from the messaging server, a respective electronic message, wherein the electronic message is sent encrypted with a respective messaging key, but is not configured to (i) encrypt a copy of the electronic message with a respective monitoring key different from the messaging key; and (ii) send the encrypted copy to the monitoring server,
   wherein the mobile devices of the first and second sets are configured to communicate with the messaging server via the network router,
   wherein the network router is configured to allow transmission of unencrypted electronic messages between the messaging server and the mobile devices of the first and second sets,
   wherein the network router is configured to block transmission of encrypted electronic messages between the messaging server and the second set of mobile devices when the encrypted electronic messages are not additionally encrypted with a monitoring key, and
   wherein the network router is configured to allow transmission of encrypted electronic messages between the messaging server and the first set of mobile devices when the encrypted electronic messages are additionally encrypted with the respective monitoring key.

2. The system of claim 1, wherein the messaging server is a network operation centre operated by a messaging service provider.

3. The system of claim 1, wherein the messaging server is a component of a corporate email system.

4. The system of claim 1, further comprising a key server configured to store or access a decryption key for decrypting the copy of the message.

5. The system of claim 1, wherein each mobile device of the first set is configured to send to the monitoring server encrypted copies of all encrypted electronic messages sent by the mobile device to the messaging server.

6. The system of claim 1, wherein each mobile device of the first set is configured to send to the monitoring server encrypted copies of all encrypted electronic messages received by the mobile device from the messaging server.

7. The system of claim 1, wherein each mobile device of the first set is configured to send the encrypted copy to the monitoring server within 60 seconds of the electronic message being sent or received by the mobile device.

8. The system of claim 1, wherein each mobile device of the first set is configured to display at least part of the electronic message.

9. The system of claim 1, wherein each mobile device of the first set is configured to receive a respective monitoring key from a key server.

10. The system of claim 1, wherein each mobile device of the first set comprises a hardware cryptography module for authenticating the mobile device to a key server.

11. The system of claim 1, wherein each mobile device of the first and second sets is configured to receive a binary input from a user representing agreement or refusal to the mobile device sending a copy of at least some electronic messages to the monitoring server.

12. The system of claim 1, wherein each mobile device of the first and second sets is configured to determine a geographical, political or jurisdictional location in which the mobile device is situated and to use the determined location to determine whether to send a copy of an electronic message to the monitoring server.

13. The system of claim 1, wherein each mobile device of the first set is configured to obtain a network address of the monitoring server from a database.

14. The system of claim 1, wherein, for each mobile device of the first and second sets, there is no path for the respective electronic message between the mobile device and the messaging server other than via the network router.

15. The system of claim 1, wherein the network router is part of a national Internet firewall.

16. The system of claim 1, wherein the network router is a component of a mobile telecommunication network, and each of the mobile devices in the first and second sets is registered on the mobile telecommunication network.

17. The system of claim 1, wherein each monitoring key, used by a mobile device of the first set, expires after the monitoring key is used once to encrypt a single copy of a respective electronic message.

18. A method of operating a communication system, the communication system comprising:
a messaging server;
a monitoring server;
a network router;
a first set of one or more mobile devices configured to (i) send to the messaging server, or receive from the messaging server, a respective electronic message, wherein the electronic message is sent encrypted with a respective messaging key; (ii) encrypt a copy of the electronic message with a respective monitoring key different from the messaging key; and (iii) send the encrypted copy to the monitoring server via the network router; and
a second set of one or more mobile devices configured to send to the messaging server, or receive from the messaging server, a respective electronic message, wherein the electronic message is sent encrypted with a respective messaging key, but not configured to (i) encrypt a copy of the electronic message with a respective monitoring key different from the messaging key; and (ii) send the encrypted copy to the monitoring server,
the method comprising:
determining that a first mobile device of the plurality of mobile devices is configured to send copies of encrypted messages to the monitoring server, and, in response, configuring the network router to allow transmission of encrypted electronic messages between the first mobile device and the messaging server when the encrypted electronic messages are additionally encrypted with the respective monitoring key; and
determining that a second mobile device of the plurality of mobile devices is not configured to send copies of encrypted messages to the monitoring server, and, in response, configuring the network router to block transmission of encrypted electronic messages between the second mobile device and the messaging server when the encrypted electronic messages are not additionally encrypted with a monitoring key.

19. A method of operating a communication system, the communication system comprising:
a messaging server;
a monitoring server;
a network router; and
a plurality of mobile devices,
the method comprising:
configuring a first set of one or more of the mobile devices to (i) send to the messaging server, or receive from the messaging server, a respective electronic message, wherein the electronic message is sent encrypted with a respective messaging key; (ii) encrypt a copy of the electronic message with a respective monitoring key different from the messaging key; and (iii) send the encrypted copy to the monitoring server via the network router;
configuring a second set of one or more of the mobile devices to send to the messaging server, or receive from the messaging server, a respective electronic message, wherein the electronic message is sent encrypted with a respective messaging key, but not to (i) encrypt a copy of the electronic message with a respective monitoring key different from the messaging key; and (ii) send the encrypted copy to the monitoring server; and
the network router blocking transmission of an encrypted electronic message travelling between a mobile device of the second set and the messaging server when the encrypted electronic message is not additionally encrypted with a monitoring key.

20. The method of claim 19, further comprising:
the network router forwarding an unencrypted electronic message travelling between said mobile device of the second set and the messaging server.

21. The method of claim 19, further comprising:
the network router forwarding an encrypted electronic message travelling between a mobile device of the first set and the messaging server.

* * * * *